Oct. 26, 1954   G. H. KRAFT ET AL   2,692,430
APPARATUS FOR CUTTING CHEESE INTO SMALL BLOCKS
Filed Sept. 9, 1950
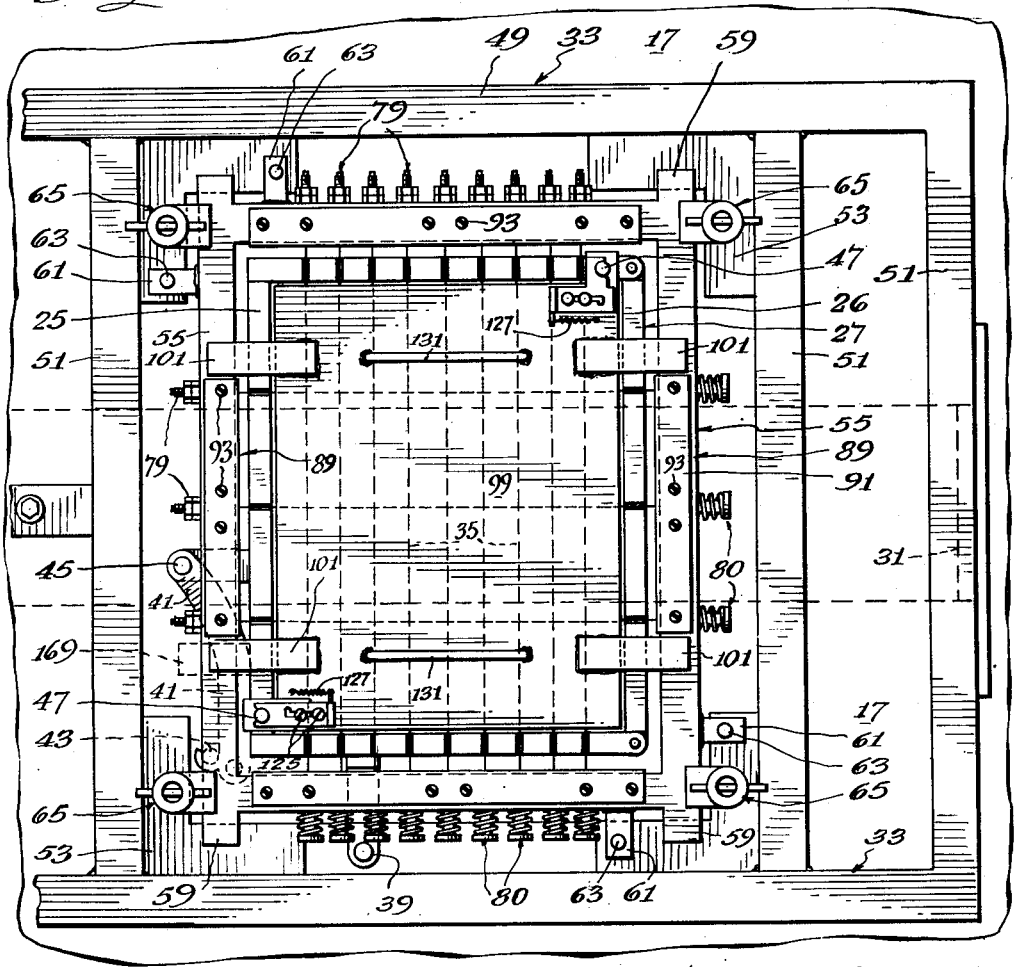
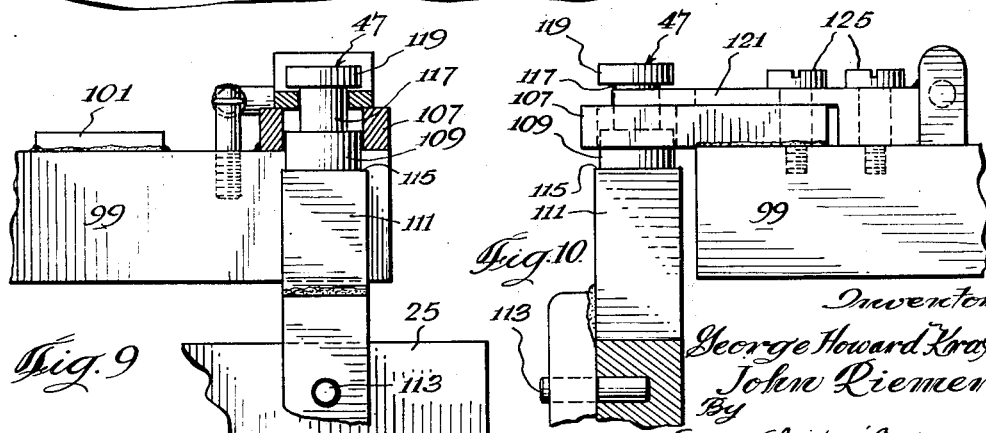
Inventors
George Howard Kraft
John Riemer
By
Soans, Glaister & Anderson
Attorneys

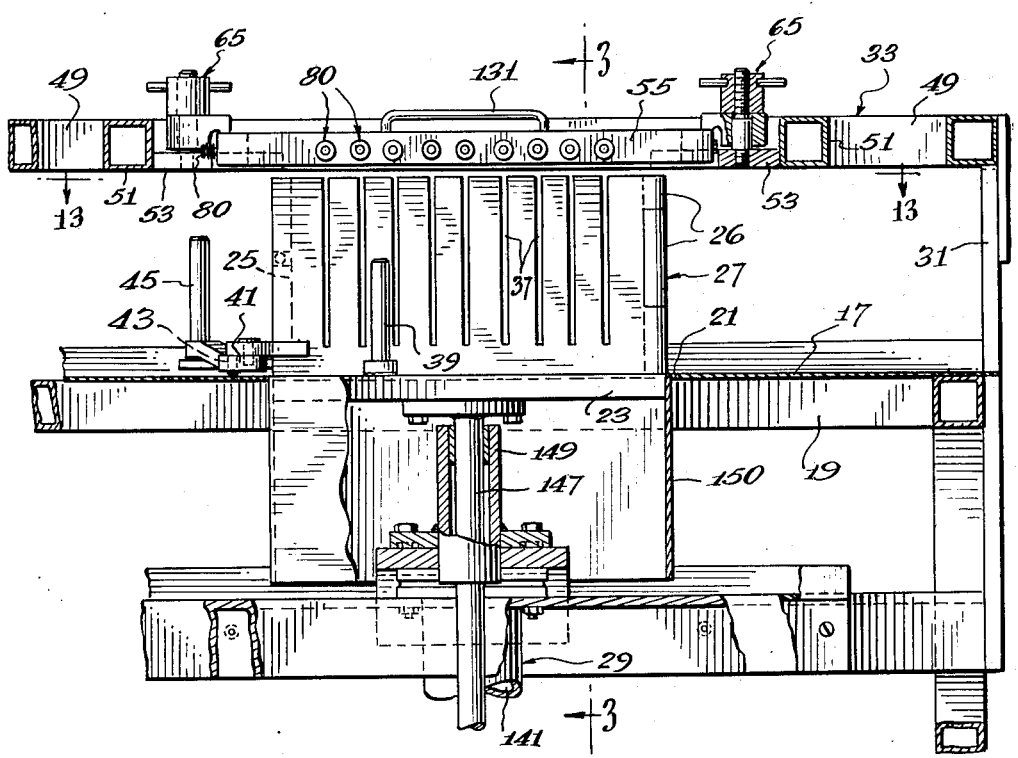
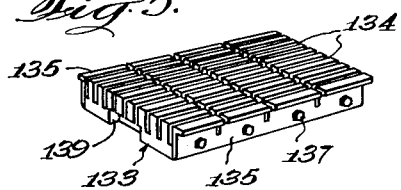
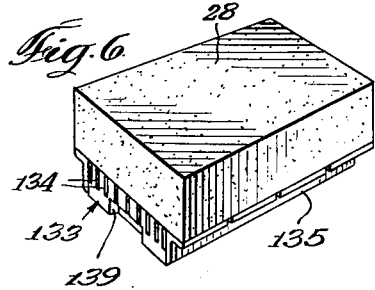
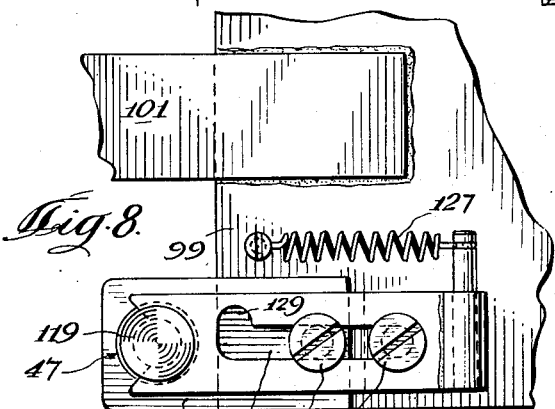

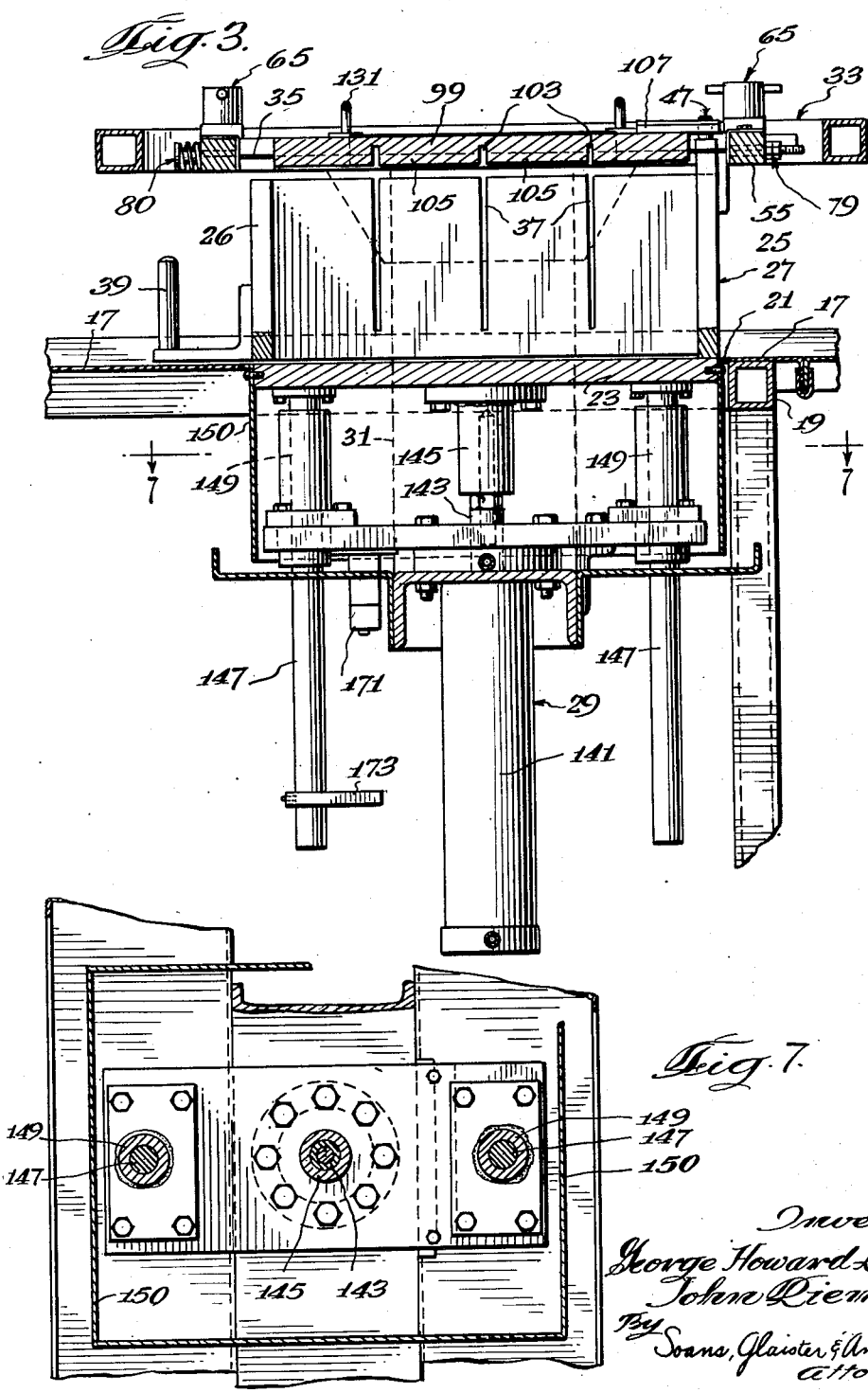

Oct. 26, 1954  G. H. KRAFT ET AL  2,692,430
APPARATUS FOR CUTTING CHEESE INTO SMALL BLOCKS
Filed Sept. 9, 1950  5 Sheets-Sheet 4
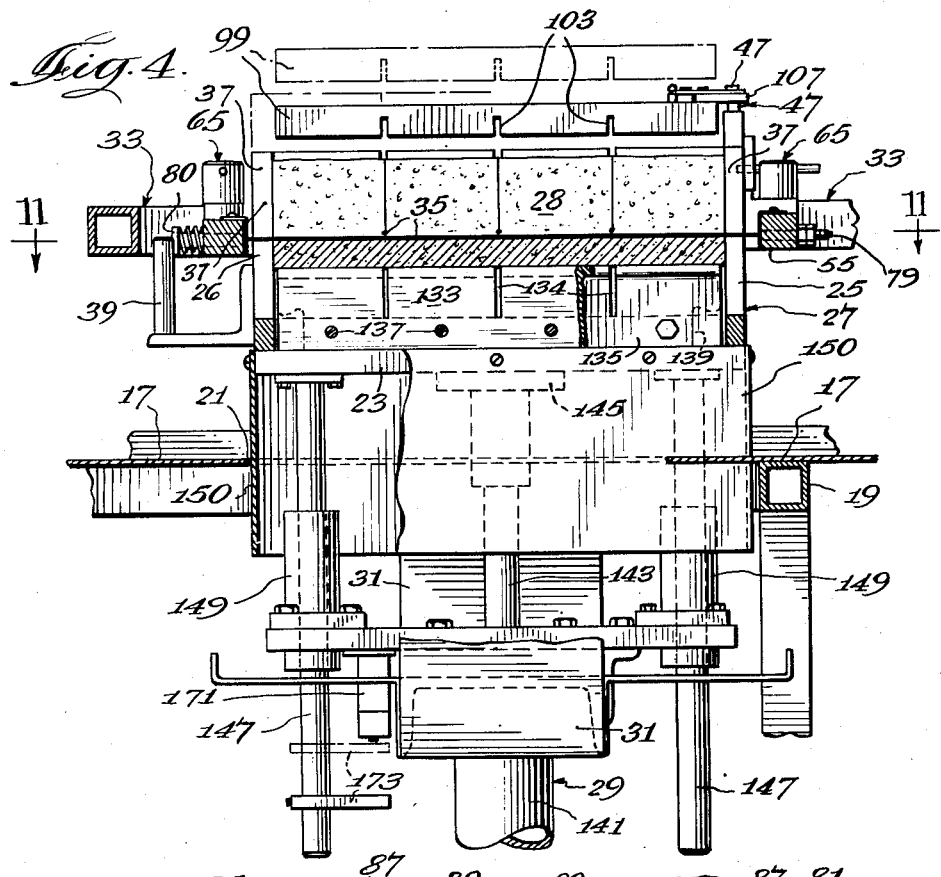
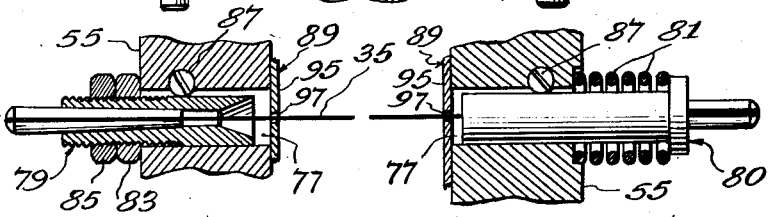
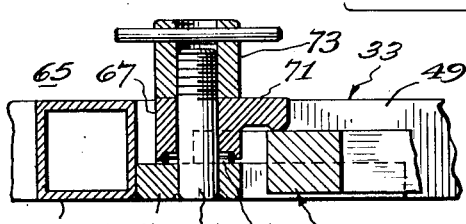
Inventors
George Howard Kraft
John Riemer
By Soans, Glaister & Anderson
Attorneys Oct. 26, 1954      G. H. KRAFT ET AL      2,692,430
APPARATUS FOR CUTTING CHEESE INTO SMALL BLOCKS
Filed Sept. 9, 1950      5 Sheets-Sheet 5
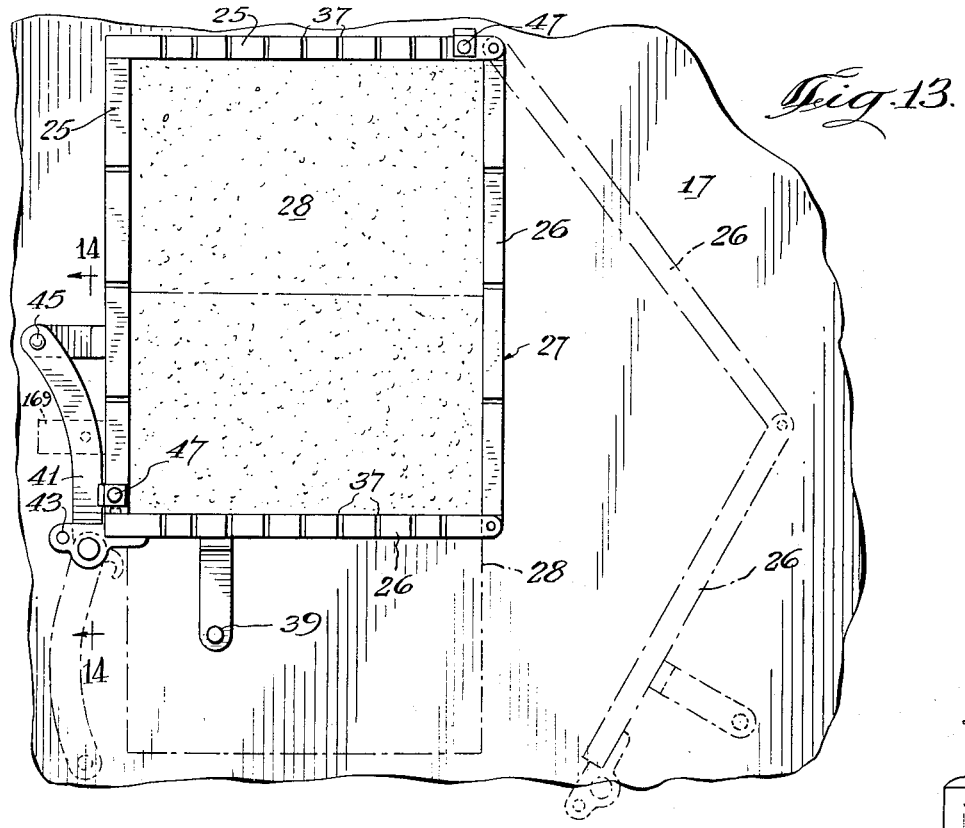
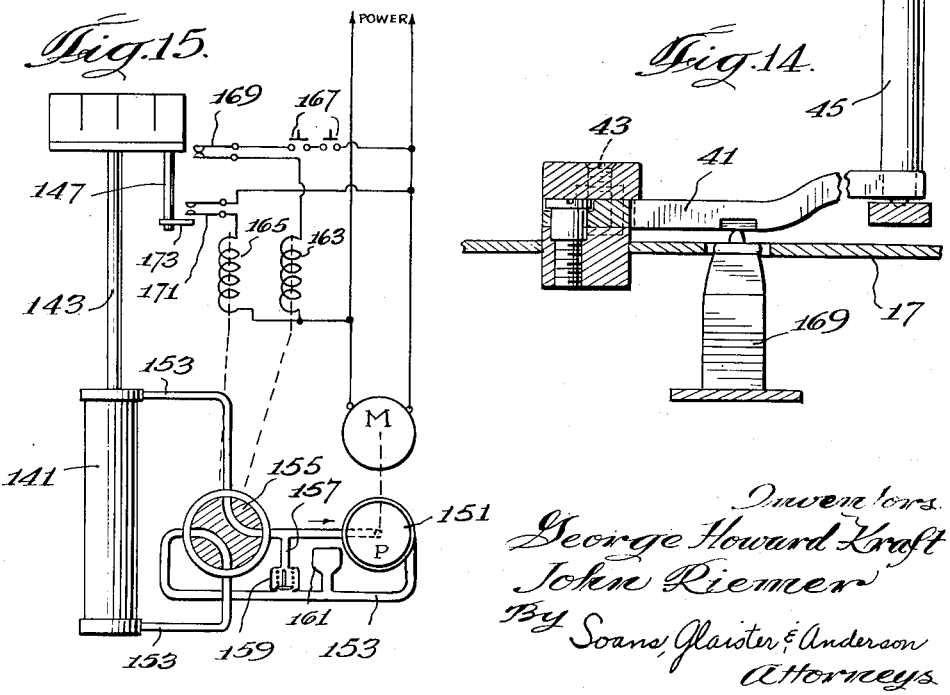

Patented Oct. 26, 1954

2,692,430

UNITED STATES PATENT OFFICE 2,692,430

APPARATUS FOR CUTTING CHEESE INTO SMALL BLOCKS

George Howard Kraft, Wilmette, and John Riemer, Chicago, Ill., assignors to Kraft Foods Company, Chicago, Ill., a corporation of Delaware Application September 9, 1950, Serial No. 183,932

5 Claims. (Cl. 31—26)

This invention relates to a method and apparatus for cutting cheese and substances of similar nature and, particularly, to the simultaneous formation of a multiplicity of small blocks of such substances from a single larger block.

It is, of course, well known that natural cheese is manufactured in large blocks which must be trimmed and reduced to smaller sized blocks for sale to the average consumer. Whereas heretofore it had been the merchandising custom for the retailer to keep on hand large blocks or wheels of cheese from which he cuts smaller quantities in accordance with the demands of individual customers, the advent of modern methods of merchandising, particularly the appearance of the self-service store, has required that the retailer have the cheese on hand in small, individually-wrapped packages ready for immediate sale. Since this method of sale would impose upon the retailer a mass packaging problem which he is for the most part unwilling or unable to assume, the preparation of individual small packages has devolved upon the food manufacturer. The problem which presents itself is one of reducing a large block of cheese to a multiplicity of small blocks in a minimum number of cuts and, preferably, in the interest of reducing the cost of the operation, in a single step or operation.

Taut wires have previously been used for trimming and cutting cheese and various types of cheese cutting devices have been proposed which utilize wires for effecting a mass cutting operation. None of these, however, has proved satisfactory when applied to single, mass operation of the size contemplated by the present invention, and the difficulties which were encountered were thought to render this procedure unfeasible. Specifically, in the passage of a large unitary block of cheese through a lattice work of taut wires, it was found that the reactive forces of the cheese on the wire during the cutting operation were such that, even though the wires were tensioned the maximum practicable amount, they were caused to bow out of prearranged alignment, and therefore necessarily produced small, individual blocks which lacked the desired uniformity of size and weight. This was found to be particularly true in the cutting wires adjacent the outer edges of the lattice, that is, those wires which passed through the large block of cheese near its outer edges. These outer wires were found to bow outwardly with the result that the small blocks formed from the marginal portions of the larger, unitary block, were bowed on one or more surfaces and were smaller in size and lighter in weight than blocks similarly produced from the central portions of the larger block. These deviations in size interfere with the proper operation of automatic packaging machinery and necessitate that certain of the off-size pieces be wrapped by hand. Furthermore, to comply with various governmental regulations concerning weight and measures, it is necessary to weigh these off-size blocks individually because of the excessive disparity between their actual weights and the desired nominal package weight.

Accordingly, it is the principal object of this invention to provide a practicable method for the formation of small blocks of cheese from a larger, single block by the use of a lattice-like system of wire cutting elements which will obviate the shortcomings of prior procedures and which will assure the formation of individual blocks of uniform and predetermined size, and to provide an improved apparatus adapted for the practice of said method.

Other objects and advantages will appear and the invention will be better understood by reference to the following specification and to the drawings in which there is illustrated one embodiment of an apparatus adapted to carry out the method of the invention.

In the drawings:

Figure 1 is a plan view of an improved cutting apparatus which is adapted to the practice of the method of the invention;

Figure 2 is a front elevational view, partly sectional, of the apparatus shown in Figure 1, showing the elements of the apparatus in inoperative position, i. e. either before or after a cutting operation;

Figure 3 is a sectional elevational view, taken on an enlarged scale along the line 3—3 of Figure 2;

Figure 4 is a side elevational view, partly sectional and somewhat similar to Figure 3, showing the apparatus in the process of cutting a block of cheese;

Figure 5 is a perspective view, on a reduced scale, of the removable pallet which supports the cheese in the apparatus;

Figure 6 is a perspective view of the pallet illustrated in Figure 5 and showing a unitary block of cheese emplaced thereon prior to the cutting operation;

Figure 7 is a plan view, partly sectional, taken along the line 7—7 of Figure 3 and showing in greater detail the elevating mechanism which propels the block of cheese upwardly through the cutting wires;

Figure 8 is an enlarged fragmentary plan view of one corner of the plate which forms a cover for the cheese-enclosing box, showing the latch mechanism with which the cover plate is attached to the box;

Figure 9 is an enlarged elevational view, partly sectional, of the latch mechanism illustrated in Figure 8;

Figure 10 is similarly an enlarged elevational view of the latch mechanism illustrated in Figure 8, projected on a plane rotated ninety degrees from the plane of the illustration of Figure 9;

Figure 11 is an enlarged fragmentary sectional plan view of the cutting-wire stretcher frame showing the means by which the wire is anchored and tensioned;

Figure 12 is an enlarged fragmentary, elevational view, partly sectional, illustrating the clamping means by which the cutting wire stretcher frame is anchored in place;

Figure 13 is a plan view of the enclosure in which the block of the cheese and its supporting pallet are emplaced, and illustrating the movable connection between various elements of the enclosure as well as the latch means for securely associating these elements in operative relationship;

Figure 14 is an enlarged sectional elevational view, taken along the line 14—14 of Figure 13; and Figure 15 is a diagrammatic illustration of the actuating means which propels the block of cheese through the cutting elements, including the electrical circuit for controlling its operation.

In general, in the practice of the method of the present invention, a block of cheese which is to be cut is placed within an enclosure which is capable of snugly surrounding the block on four of its sides and exerting upon the block a predetermined small amount of pressure. The cutting wires are then passed through the block generally at right angles to the direction or plane in which the block is compressed, to divide the block into pieces of smaller size. It has been found that by snugly supporting the large unitary block in this fashion, the tendency of the cutting wires to bow out of their predetermined alignment is eliminated and that small blocks of uniform, predetermined sizes are consistently produced.

Referring to the drawings, the illustrated apparatus comprises a table top 17 supported upon a normally stationary sub-frame 19 and having an aperture 21 in which there is disposed a vertically movable platform 23 provided with upwardly extending side walls 25 and 26 defining a box 27 for confining a block of cheese 28 (Fig. 4). On the sub-frame beneath the table surface there is mounted power-driven actuating means 29 for elevating the platform above its normal inoperative or rest position flush with the table surface. Mounted above the table surface upon a pair of standards 31 rigidly connected to the sub-frame 19, is an auxiliary frame 33 which is adapted to support a lattice of cutting wires 35 above the vertically movable platform 23. The walls of the box 27 which encloses the block of cheese are provided with vertical slots 37 which are aligned with the respective cutting wires 35 and are open at their upper ends so that the platform, the box and the enclosed block of cheese may be propelled upwardly to force the block of cheese through the lattice of cutting wires for division into a plurality of blocks of smaller size.

The two side walls 25 of the box 27 are rigidly attached to the platform 23, whereas the other two walls 26 are movable on hinge mountings to permit the insertion of a cheese block and to snugly enclose the cheese within the box 27 (Fig. 13). The movable wall 26 adjacent the forward edge of the table surface is desirably provided with a handle 39 with which an operator may open and close the box. A hooked latch lever 41 pivotally mounted on the adjacent fixed wall 25 is adapted to engage a pin 43 on the movable wall 26 to lock the box in its closed position. The latch lever is similarly provided with a handle 45 within easy reach of the operator. Additionally, the box is provided at diagonally opposite corners with a pair of upwardly extending dowel pins 47 secured to the fixed walls 25 for a purpose which will be hereinafter described.

The auxiliary, cutting-wire supporting frame 33 (Fig. 1) comprises a pair of spaced-apart frame members 49 disposed longitudinally of the table and a plurality of transverse frame members 51 extending between, and secured to, the longitudinal frame members. These transverse frame members are desirably arranged so that one is disposed at either side of the vertically movable platform 23 so as to form an open panel immediately above the platform, and an L-shaped bracket 53 is rigidly secured to the auxiliary frame 33 in each of the four corners of the panel. Disposed within the aforementioned panel is a rectangular stretcher frame 55 upon which the cutting wires 35 are mounted. The longer members of the stretcher frame 55 are provided with stub extensions 59 which rest upon the L-shaped brackets 53 to support the stretcher frame upon the auxiliary frame 33. Additionally, the stretcher frame 55 is provided at diagonally opposite corners with outwardly extending lugs 61 each of which is provided with a hole which engages an upwardly-extending dowel pin 63 mounted on the L-shaped bracket 53. Moreover, each L-shaped bracket is provided with clamping means 65 for securing the stretcher frame 55, and hence the cutting wires 35, in place as the block of cheese is propelled upwardly.

By mounting the cutting wires on a readily removable frame, in this manner, the replacement of broken cutting wires may be quickly and easily effected by simply removing the entire stretcher frame and replacing it with a spare. The broken wires may then be replaced at leisure without interfering with production.

The clamping means 65 (see Figure 12) comprises a collar 67 journalled on a stud bolt 69 secured to the L-shaped bracket 53, and having an outwardly projecting arm 71 disposed to engage the upper surface of the stretcher frame 55. A wing nut 73 is provided to force the arm 71 downwardly into clamping engagement with the stretcher frame against the action of a compression spring 75 which normally supports the collar 67 and its associated arm 71 above and out of clamping engagement with the stretcher frame. When the wing nut is loosened, the collar may be swivelled about the stud bolt to swing the clamping arm clear of the stretcher frame to permit the stretcher frame 55 to be lifted clear of the auxiliary frame 33.

The stretcher frame 55 is desirably formed of solid bar stock of substantial dimension so as to have sufficient strength to resist the combined pull of the cutting wires 35 which extend in parallel sets between opposed holes 77 in the stretcher frame members 57. In the illustrated embodiment, two sets of wires cross one another at right angles so that the smaller individual cheese blocks formed will be generally rectangular in cross section. The ends of the cuttings wires 35 are secured in the holes 77 by means of wire anchors 79 and 80 which may be of the taper plug type as illustrated in Figure 11, and which are desirably provided with adjustment means so that the cutting wires may be uniformly tensioned in accordance with the requirements of the particular kind of cheese or other material being cut. This adjustment may be accomplished by providing, for example, a compression spring 81 between the anchor 80 and the frame 55 at one end of the wire, and by threading the anchor 79 at the other end of the wire and providing an adjusting nut 83 and a lock nut 85, as illustrated. It may be desirable to provide additional means such as the set screws 87 to secure the anchors in place once the desired tension adjustment has been made and to prevent their being dislodged should any of the wires break.

In view of the fact that the position of the cutting wires within the holes 77 may vary according to the rotative position of the taper plugs which necessarily dispose the wire somewhat off-center of the anchor, it is desirable to provide wire guides in the form of angle plates 89 secured to the stretcher frame 55. One leg 91 of the guide plate 89 is attached by screws 93 to the upper side of the stretcher frame 55 and the depending leg 95 is provided with vertical slots 97 of slightly greater width than the wire diameter, through which the cutting wires pass. By accurately locating the slots 97 relative to one another, and by fixing the position of the wire guides with respect to the stretcher frame, the desired alignment of the cutting wires may be maintained irrespective of the rotative position of the wire anchors. These guide plates 89 also serve the incidental purpose of closing off the holes 77 in the stretcher frame to prevent the accumulation therein of foreign material.

After the cheese has been cut, the platform 23 is lowered to its normal position flush with the table surface to permit the box 27 to be opened for removal of the individual cheese blocks. However, as the platform is lowered, the cut cheese passes downwardly through the cutting wires which exert a dragging force tending to lift individual blocks. To eliminate this tendency and to thereby prevent damage to the individual blocks, a cover plate 99 is provided to secure the individual blocks against dislocation by the cutting wires as the platform is lowered to its normal position.

When the apparatus occupies its inoperative position, the cover plate 99 is supported upon the cutting wire stretcher frame 55 by sidewardly projecting lugs 101 secured to the top surface of the cover plate. The cover plate is preferably quite thick and is provided on its underside with a plurality of serrations 103 aligned with the cutting wires 35 which define bosses or projections 105 which extend downwardly between the cutting wires when the platform is at rest in its inoperative position.

To maintain the alignment of the cover-plate serrations with the cutting wires, locator plugs 107 are secured to the upper surface of the cover plate 99 at diagonally opposite corners thereof, these lugs 107 being provided with holes adapted to engage the previously-mentioned dowel pins 47 extending upwardly from the fixed side walls 25 of the cheese-enclosing box 27. As is most clearly illustrated in Figures 8, 9 and 10, the dowel pins 47 comprise upwardly extending cylindrical projections 109 of a pillow block 111 secured by means of a pin 113 to the side wall of the box, there being a shoulder or abutment 115 formed at the junction of the pin with the block. The pin is provided with an intermediate portion 117 of reduced diameter so as to form at its upper end a retaining head 119. Each locator lug 107 is provided with a sliding latch member 121 having a bifurcated end adapted to engage the reduced diameter portion 117 of the pin to prevent removal of the cover plate when the latch and the pin are so engaged. A longitudinal slot 123 in the latch member engages a pair of spaced screws 125 in the cover plate 99 to permit the latch member to be slid longitudinally into and out of engagement with the dowel pin. A tension spring 127 is provided to normally urge the latch member into engagement with the dowel pin 47 and the longitudinal slot 123 is provided at one end with an offset portion 129 so that when the latch member is fully withdrawn out of engagement with the pin, the spring 127 is effective to rotate the latch member about one of its confining screws 125 while the other screw enters the offset portion 129 to secure the latch member in an inoperative position.

It will be apparent from Figures 9 and 10 that, when the cover plate 99 is supported by the stretcher frame 55, the undersides of the locator lugs 107 are spaced a definite distance upwardly from the aforementioned shoulders 115 on the dowel pins 47. Therefore, as the platform and cheese-enclosing box move initially upwardly, there is a certain amount of lost motion before the shoulders 115 engage the undersides of the locator lugs 107 to lift the cover plate, thereby permitting the block of cheese to be brought into engagement or near engagement with the underside of the cover plate before the cover plate is positively lifted.

In the event that the drag of the cutting wires on the cheese during the downward movement of the platform should be sufficient to lift the relatively massive cover plate 99, the latch members 121 will engage the head 119 of the dowel pin 47 and the cover plate will be urged positively downwardly, forcing the cheese through the cutting wires. When the latch members are disengaged from the dowel pins, the cover plate may be lifted clear of the apparatus by means of a pair of handles 131.

To facilitate handling of the cheese, particularly after the large block 28 has been divided into smaller blocks, the cheese is supported in the apparatus by a removable pallet 133, illustrated in Figures 5 and 6. The pallet is generally rectangular in form and is slightly smaller in overall dimension than the interior of the cheese-enclosing box 27 to permit the walls of the box to compress the cheese. The pallet is sufficiently thick that its upper surface may be provided with serrations 134 in the same manner as is the underside of the cover plate 99 in order to permit the passage of a portion of the pallet upwardly through the lattice of cutting wires to assure that the cutting wires will pass all the way through the cheese block. Because the pallet is moved into and out of the machine by hand, it is desirably made as light in weight as possible. In the present instance, the pallet is fabricated from a block of plastic material such as Lucite and is re-enforced along two of its sides by angle members 135 which are secured together and to the block by bolts 137 passing through the block from one side to the other. For ease of handling, the pallet is provided at each end with a cut-out portion 139 which provides a convenient hand grip for grasping the pallet.

Cutting apparatus of the above-described type, wherein the cheese is projected upwardly through the cutting wires and then lowered to its initial position, has the distinct advantage that much of the handling of the cheese involved in the cutting methods presently employed is eliminated. The cheese may be delivered on the pallets 133 at table level by a conveyor and slid into position on the elevating platform 23 which, as previously described, normally occupies a position flush with the table top 17. After the block has been cut and the platform returned to its flush position in the table top, the individual small blocks may be similarly transferred to a conveyor for delivery to the packaging machines without removing them from the pallet. The operator is thus relieved of the wearying task of lifting blocks of cheese which may weigh from 20 to 40 lbs., and much of the damage which now results from mishandling the small blocks of cheese after cutting may be eliminated.

In the illustrated embodiment, the actuating means 29 employed for elevating the platform 23 comprises a double-acting cylinder 141 secured to the sub-frame and having therein a piston (not shown) connected to the underside of the platform 23 by means of an upwardly extending connecting rod 143 and a flange fitting 145. To steady the movement of the platform and to prevent its rotation about the axis of the connecting rod, there is secured to the underside of the platform a pair of downwardly extending guide rods 147 which are slidably enclosed within guide bushings 149 secured to the table sub-frame 19. A depending skirt or flange 150 is secured to the platform 23 as a guard against the insertion of foreign objects between the platform and the table top 17 when the platform is raised in order to prevent injury to the apparatus as well as the operator.

To actuate the driving cylinder, there is provided a hydraulic system including a motor-driven pump 151, illustrated diagrammatically in Figure 15, which may be alternately connected through suitable conduit 153 and a two-position, four-way rotary control valve 155 to opposite sides of the piston within the cylinder 141. The pump is preferably operated continuously and the system is therefore provided with a suitable by-pass channel 157 and check valve 159 to relieve the pump when the piston reaches the end of its stroke or if the control valve 155 should become stuck in an inoperative position. A bell or closed stand pipe 161 provides a pneumatic cushion to prevent hammering when the control valve is shifted.

The control valve 155 is shifted between its operative positions to alternately raise and lower the platform by a pair of solenoids 163 and 165 arranged in an electrical control circuit. To position the valve for elevating the platform, the solenoid 163 is connected across a source of power in series with a pair of manually-operated, normally-open switches 167 and a normally-open, inter-locking switch 169 which is actuated by the latch lever 41 on the cheese enclosing box 27 (Figure 14). It will be apparent therefore, that the solenoid 163 can only be energized when the latch lever is firmly secured in locking position. The two manually-operated switches 167 are preferably located at the front and below the level of the table top 17 to assure that both of the operator's hands will be below the table surface out of harm's way before the apparatus can be put into operation.

The other solenoid 165 is similarly connected across the power source in series with a normally-open switch 171 which is automatically closed when the platform 23 reaches the upper limit of its travel. In the illustrated apparatus, the switch 171 is located on the sub-frame 19 beneath the table top 17 and is actuated by a sidewardly projecting arm 173 secured to one of the platform guide rods 147. As the platform travels upwardly, this projecting arm engages the switch 171 to energize the solenoid 165 which positions the control valve 155 to apply fluid pressure to the top side of the piston, thereby positively forcing the platform 23 downwardly and drawing the cheese downwardly through the cutting wires.

It will be apparent from the foregoing description, that the present invention provides an improved method and apparatus for dividing a large unitary block of cheese, or product of similar nature, into a multiplicity of smaller blocks of more convenient size in a single cutting operation. This improved method contemplates that the large block will be lightly compressed in one plane and then cut in a direction generally perpendicular to the plane or direction in which the block is compressed. In the illustrated apparatus, this is accomplished by placing a block of cheese to be cut within an enclosure having fixed dimensions which are so related to the dimensions of the cheese block that the sides of the enclosure apply slight pressure, and then passing the block through a lattice of cutting wires.

For example, in a commercial embodiment of this type of machine designed for cutting a 20 pound block of Cheddar cheese 14⅛ inches long, 11⅛ wide and 3½ in height, the inner dimensions of the cheese-enclosing frame were $14\frac{1}{16}$ by $11\frac{1}{16}$ inches. Thus, as the walls of the cheese-enclosing box were securely locked in closed position, a slight compressive force was applied to the block. The cutting wires were spaced on 1.106 inch centers along the shorter dimension of the box and on 3.515 inch centers along the longer dimension so as to produce 40 uniformly sized blocks one-half pound in weight. Tests have shown that the individual blocks produced by this machine operating in the above-described manner varied no more than 3 grams from the nominal half-pound weight, irrespective of the location of the half-pound block within the larger 20 pound unitary block.

It will be apparent, therefore, that the difficulties which have heretofore prevented the practicable use of cutting means of this general type are overcome when the method of the present invention is employed and that small blocks of uniform size and weight may be consistently obtained from all portions of a relatively large block in a single cutting operation.

Various of the features of the present invention which are believed new and patentable are set forth in the following claims.

We claim:
1. A cheese cutting device comprising a fixed frame having an opening therein, at least one wire extending across said opening and having terminal ends attached to said frame, a box of less cross-sectional area than said opening for containing a block of cheese and having two pairs of opposite upwardly extending sides, means for movably supporting at least two adjacent sides of said box whereby said adjacent sides are movable relative to the other sides so as to permit enlargement of the cross-sectional area of said box for insertion of a block of cheese, at least one pair of said opposite sides having upwardly open slots, said wire being in alignment with said slots, and means operatively connected to move said box through the opening in said frame whereby the cheese will be cut and held in its original position.

2. A cheese cutting device comprising a fixed frame having an opening therein, at least one wire extending across said opening and having terminal ends attached to said frame, a box of less cross-sectional area than said opening for containing a block of cheese and having two pairs of opposite upwardly extending sides, hinge means connecting two of said sides at one corner of said box, releasable locking means connecting the other two sides at a diagonally opposite corner whereby two adjacent sides of said box are movable relative to the other sides so as to permit enlargement of the cross-sectional area of said box for insertion of a block of cheese, at least one pair of said opposite sides having upwardly open slots, said wire being in alignment with said slots, and means operatively connected to move said box through the opening in said frame whereby the cheese will be cut and held in its original position.

3. A cheese cutting device comprising a fixed frame having an opening therein, at least one wire extending across said opening and having terminal ends attached to said frame, a box of less cross-sectional area than said opening for containing a block of cheese and having two pairs of opposite upwardly extending sides, means for movably supporting at least two adjacent sides of said box whereby said adjacent sides are movable relative to the other sides so as to permit enlargement of the cross-sectional area of said box for insertion of a block of cheese, at least one pair of said opposite sides having upwardly open slots, said wire being in alignment with said slots, means operatively connected to move said box through the opening in said frame whereby the cheese will be cut and held in its original position, and a top plate of less cross-sectional area than said box, said top plate having serrations formed therein in position to receive said wire.

4. A cheese cutting device comprising a fixed frame having an opening therein, at least one wire extending across said opening and having terminal ends attached to said frame, a box of less cross-sectional area than said opening for containing a block of cheese and having two pairs of opposite upwardly extending sides, hinge means connecting two of said sides at one corner of said box, releasable locking means connecting the other two sides at a diagonally opposite corner whereby two adjacent sides of said box are movable relative to the other sides so as to permit enlargement of the cross-sectional area of said box for insertion of a block of cheese, at least one pair of said opposite sides having upwardly open slots, said wire being in alignment with said slots, and mean operatively connected to aid box for moving the same through the opening in said frame whereby the cheese will be cut and held in its original position.

5. A cheese cutting device comprising a fixed frame having an opening therein, at least one wire extending across said opening and having terminal ends attached to said frame, a box of less cross-sectional area than said opening for containing a block of cheese and having two pairs of opposite upwardly extending sides, hinge means connecting two of said sides at one corner of said box, releasable locking means connecting the other two sides at a diagonally opposite corner whereby two adjacent sides of said box are movable relative to the other sides so as to permit enlargement of the cross-sectional area of said box for insertion of a block of cheese, at least one pair of said opposite sides having upwardly open slots, said wire being in alignment with said slots, means operatively connected to said box for moving the same through the opening in said frame whereby the cheese will be cut and held in its original position, and a top plate of less cross-sectional area than said box, said top plate having serrations formed therein in position to receive said wire.

References Cited in the file of this patent

UNITED STATES PATENTS

| Number | Name | Date |
|---|---|---|
| 791,462 | Gibbons | June 6, 1905 |
| 1,151,674 | Durrant | Aug. 31, 1915 |
| 1,851,991 | Skelton | Apr. 5, 1932 |
| 2,350,586 | Carroll | June 6, 1944 |
| 2,489,504 | Schlude | Nov. 29, 1949 |

FOREIGN PATENTS

| Number | Country | Date |
|---|---|---|
| 86,834 | Sweden | July 14, 1936 |